Dec. 2, 1969  W. R. PARKHURST  3,481,631
TRAILER HITCH ASSEMBLY
Filed Dec. 12, 1968  2 Sheets-Sheet 1
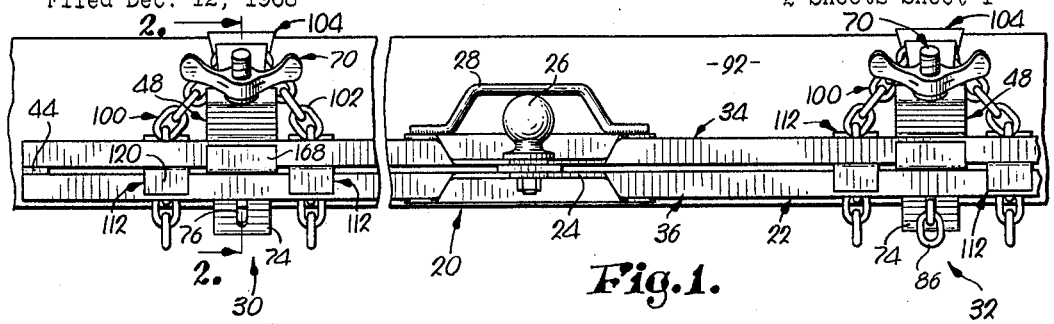
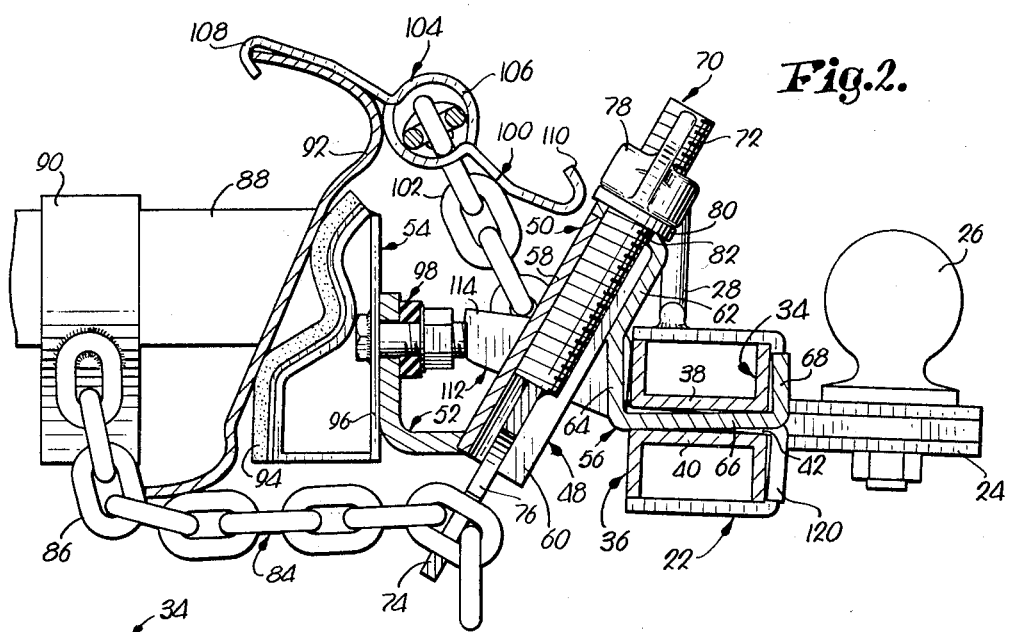
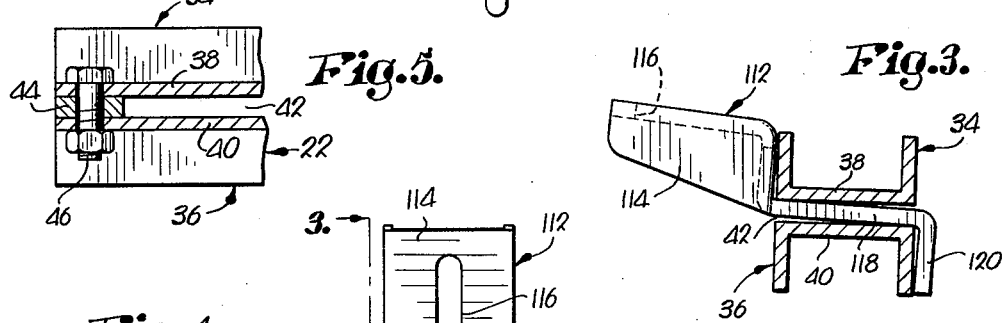
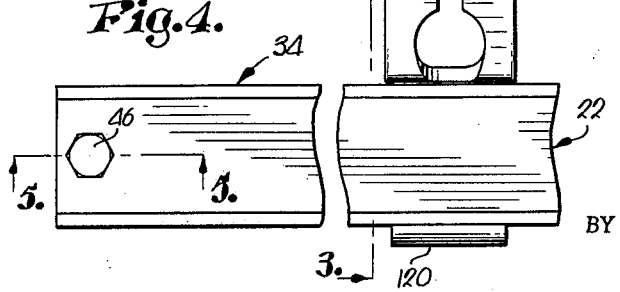
INVENTOR
William R. Parkhurst
BY Schmidt, Johnson, Hovey,
Williams & Bradley
ATTORNEYS.

Dec. 2, 1969  W. R. PARKHURST  3,481,631
TRAILER HITCH ASSEMBLY
Filed Dec. 12, 1968  2 Sheets-Sheet 2
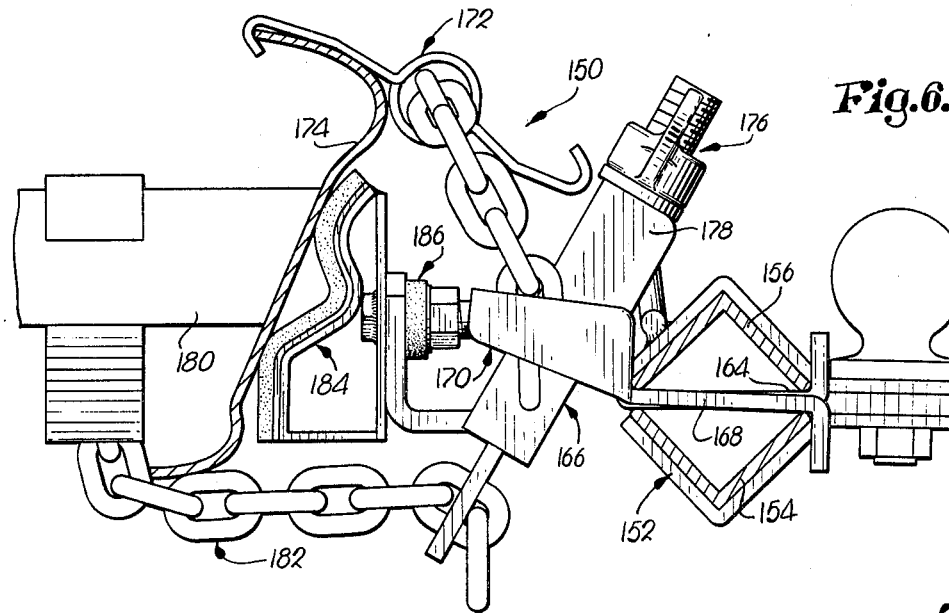
Fig.6.
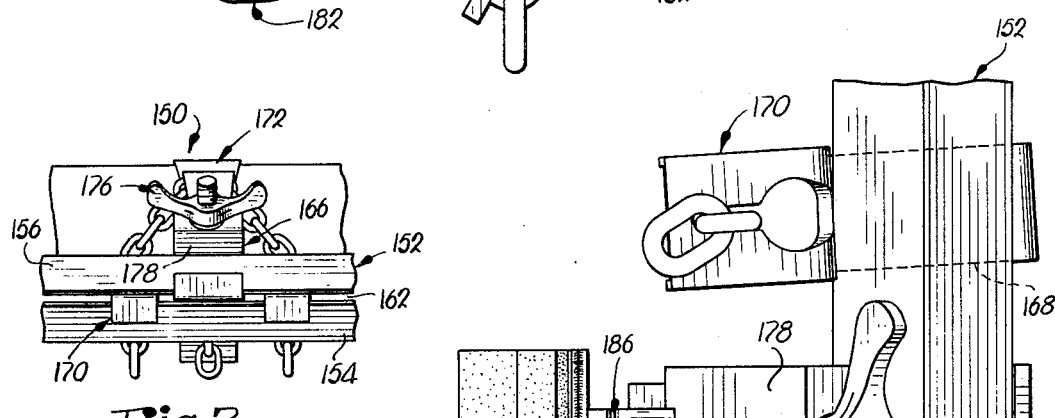
Fig.7.
Fig.8.
Fig.9.
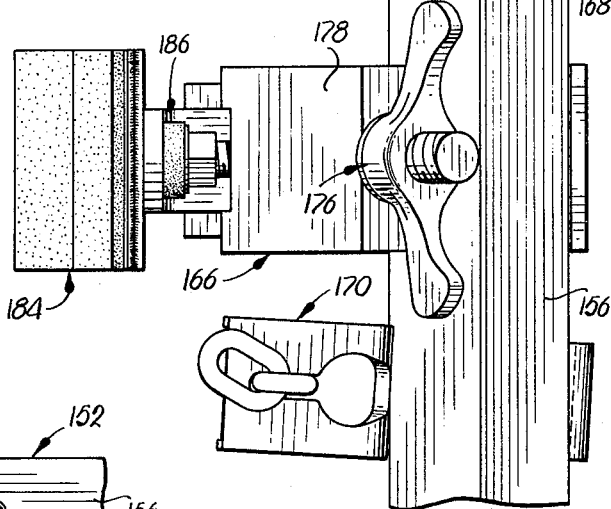
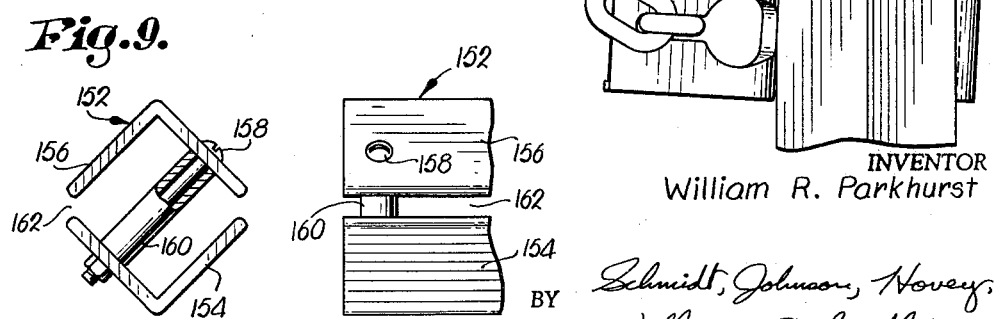
Fig.10.
INVENTOR
William R. Parkhurst
BY
Schmidt, Johnson, Hovey,
Williams & Bradley
ATTORNEYS.

United States Patent Office 3,481,631
Patented Dec. 2, 1969

3,481,631
TRAILER HITCH ASSEMBLY
William R. Parkhurst, Sedalia, Mo., assignor to Parkhurst Manufacturing Company, Sedalia, Mo., a corporation of Missouri
Continuation-in-part of application Ser. No. 729,966, Mar. 9, 1967. This application Dec. 12, 1968, Ser. No. 783,287
Int. Cl. B60d 1/06, 1/12
U.S. Cl. 280—502                    9 Claims

ABSTRACT OF THE DISCLOSURE

A trailer hitch assembly for coupling a towed vehicle to attachable structure in the nature of the bumper and frame bracket of a towing vehicle, the trailer assembly including a drawbar, the drawbar having a centrally disposed, longitudinally extending slot formed therein, there being a pair of spaced-apart hitch units carried by the drawbar, each hitch unit including a mount, together with releasable mechanism for coupling the mount with the attachable structure, and other releasable mechanism for coupling the bumper with the drawbar, the mount and the other releasable mechanism each having portions which extend through the slot in the drawbar whereby the same may be shifted longitudinally thereof to position the mount and the couplers with respect to the towing vehicle and whereby said components may be held in their relative positions when the trailer hitch assembly is fully attached to the towing vehicle.

Cross-references

This application is a continuation-in-part of application Ser. No. 729,966, filed Mar. 9, 1967, and entitled "Trailer Hitch."

It is the primary object of this invention to provide a trailer hitch assembly which can be quickly and securely attached to structure on a towing vehicle, the components of the trailer hitch assembly being of such a nature as to accommodate the attachable structure which is in the nature of a bumper and frame brackets carried by virtually all presently known vehicles, all to the end that the trailer hitch assembly may be universally used to couple a towed vehicle to a towing vehicle.

It is another important object of this invention to provide a trailer hitch assembly which includes a drawbar having a centrally disposed, longitudinally extending slot formed therein and which drawbar carries a pair of hitch units, each of the units being identical and each having means which are received within the slot and retained therein in such a manner as to permit longitudinal shifting movement of the hitch units with respect to the drawbar and which, once the assembly is fully in position, will be securely retained with respect to the drawbar.

Another important object of this invention is to provide, in a trailer hitch assembly, a mount which is carried by the drawbar and which has means thereon for engaging the bumper of the towing vehicle, the mount having an extension which is received within the slot of the drawbar, and a sleeve, which sleeve carries take-up means, the take-up means being coupled with releasable mechanism whereby the mount may be attached to the frame bracket of the towing vehicle.

A yet further object is to provide, in a trailer hitch assembly, additional means for coupling the drawbar of the assembly with the towing vehicle, such means being in the form of a chain having a pair of free ends, each of the ends having a coupler attachable thereto, which couplers have flange portions which extend through the slot in the drawbar whereby to permit longitudinal shifting movement of the couplers with respect to the drawbar, there being means for retaining said couplers within said slot.

Other objects include details of construction which will become apparent from the following specification and accompanying drawings, wherein:

FIGURE 1 is a fragmentary, rear elevational view showing one form of the trailer hitch assembly attached to one type of bumper;

FIG. 2 is a fragmentary, substantially central, vertical cross-sectional view of a hitch unit such as illustrated in FIG. 1 and showing the same mounted on a bumper;

FIG. 3 is a view taken along line 3—3 of FIG. 4;

FIG. 4 is a fragmentary, top plan view of a portion of the drawbar and showing a coupler associated therewith;

FIG. 5 is a fragmentary sectional view taken along line 5—5 of FIG. 4;

FIG. 6 is a fragmentary, side elevational view of a hitch unit showing the same as carried by another form of drawbar, parts being in section;

FIG. 7 is a fragmentary, rear elevational view showing the hitch unit as coupled with a towing vehicle;

FIG. 8 is a fragmentary, top plan view of a hitch unit such as shown in FIG. 6;

FIG. 9 is an end elevational view of the other form of drawbar; and

FIG. 10 is a fragmentary, elevational view of one end of said other form of drawbar.

In the embodiment of the invention illustrated in FIGS. 1-5 the trailer hitch assembly, broadly designated by the numeral 20 includes, as its primary components, a drawbar 22, which drawbar has fixedly secured thereto substantially centrally thereof a shelf 24, which shelf carries a ball 26, the ball being adapted to receive the socket of a tongue which is conventionally provided on towed vehicles such as trailers and the like. A handle 28 is welded to one face of drawbar 22 for the purpose of carrying the same.

Assembly 20 includes a pair of identical hitch units 30 and 32 which are disposed at spaced-apart positions on the drawbar, there being a hitch unit on each side of the ball 26 whereby said units 30 and 32 may be utilized to attach the drawbar 22 to the towing vehicle. Since the units 30 and 32 are identical in construction, only one of the same will be described hereinafter, reference being particularly made to FIGS. 1 and 2 of the drawings.

In the embodiment of the invention illustrated in FIGS. 1-5 the drawbar is in the form of a pair of opposed channel members 34 and 36 which are each U-shaped in cross-sectional configuration, the bights 38 and 40 of the channel members 34 and 36 being in opposed, spaced-apart relationship as shown for instance, in FIG. 3 of the drawings whereby to define a slot 42 therebetween, said slot 42 being positioned substantially centrally of the drawbar 22 and extending throughout the length thereof except for portions of the slot which are filled, for instance, by a part of the shelf 24 and those portions adjacent the ends of the drawbar 22 which are filled as by spacer blocks 44 as shown, for instance, in FIG. 5, said spacer blocks 44 being positioned at the ends of the slot 42 or at other desired and necessary locations therealong whereby to retain the channel members 34 and 36 in spaced-apart relationship whereby to maintain the continuity of width of slot 42. Bolts such as 46 may be utilized in conjunction with spacer blocks 44 to securely attach the channels 34, 36 together whereby to create the drawbar 22.

Each hitch unit includes a mount 48 which is carried by the drawbar 22, the mount 48 including a sleeve 50; an arm 52 which is L-shaped and which extends forwardly from sleeve 50 and which carries a bumper-engaging member 54; there being an extension 56 extending rearwardly from the sleeve 50 and serving to carry the mount 48.

The sleeve 50 includes a front wall 58, opposed sidewalls 60 with the back wall 62 thereof extending only part of the overall length of the sleeve 50 and joining with a leg 64 which is part of extension 56, leg 64 merging with a bight portion 66, the bight having a rearmost leg 68 which extends laterally therefrom whereby to retain the extension 56 within the slot 42, all in the manner clearly illustrated in FIG. 2 of the drawings.

The sleeve 50 receives take-up means 70, which take-up means is in the form of a screw 72 which extends into sleeve 50, the screw 72 having a key plate 74 at one end thereof, the key plate having a keyhole slot 76 formed therein. Take-up means 70 also includes a wing nut 78 at the uppermost end thereof, which nut bears against a washer 80, which washer 80 overlies an opening 82 formed in the upper end of sleeve 50 and through which screw 72 extends into said sleeve.

The take-up means is coupled with releasable mechanism 84 which is in the form of a chain 86, said releasable mechanism 84 serving to couple the mount 48 with the frame bracket 88 of the towing vehicle by means of a hook 90 which is engaged with said frame bracket, the hook 90 being carried by one end of the chain 86. The other end of chain 86 is adapted to be received within and retained by keyhole slot 76 in key plate 74.

Mount 48 also carries structure for engaging the bumper 92 of the towing vehicle, such structure being in the form of a cushion 94 carried by a frame assembly 96, there being apparatus 98 shiftably securing the frame 96 to the vertical leg of arm 52. Through such apparatus 98 the plane of vertical inclination of the cushion 94 may be shifted from a first position to a second position to thereby accommodate bumpers of various configurations and inclinations, thus rendering the hitch assembly universal in nature.

The hitch unit also includes additional releasable mechanism 100 which serve to attach the drawbar to the bumper of the towing vehicle, said releasable mechanism 100 being in the form of a chain 102 having a pair of free ends, there being a latch 104 disposed intermediate said ends, said latch 104 presenting a sleeve 106 which receives chain 102, the latch 104 also including a pair of opposed hook-like catches 108 and 110 which are each of a different radius whereby each may be selectively accommodated to the upper edge of the bumper 92 of the towing vehicle.

The length of chain 102 has, at each of the free ends thereof, a coupler 112 best illustrated for instance, in FIG. 3 of the drawings, the coupler including a head 114 having a keyhole slot 116, there being a flange 118 secured to said head 114 and extending rearwardly therefrom and within slot 42, there being a lip 120 which extends laterally from the flange 118 and serves to retain the coupler 112 therewithin.

It will be appreciated that the free ends of the chain 102 may each be coupled with a corresponding coupler 112 by inserting said ends in the keyhole slot 116 of its corresponding coupler whereby to provide mechanism for releasably attaching the drawbar 22 to the bumper 92.

When the device above described is to be utilized the hook 90 is brought into engagement with the frame bracket 88 and the free end of chain 86 is then engaged with keyhole slot 76 whereby the same is retained therein. The latch 104 is utilized, as by using either catch 108 or catch 110, to engage the upper edge of the bumper 92, the free ends of the chain 102 which carries latch 104 then each being engaged with a corresponding coupler 112 as by passing the ends of the chain into keyhole slots 116.

When the hitch unit has been arranged in the manner above described it will be appreciated that the mount 48 is coupled with the frame bracket 88 and the drawbar 22 is coupled with the bumper 92. Ready adjustment of the hitch unit 30 for instance, longitudinally of the drawbar 22, is permissible inasmuch as the couplers 112 and the mount 48 are all carried by the drawbar 22 and, more particularly, by the slot 42 thereof in such a manner that said components may be shifted longitudinally of the drawbar whereby to position the hitch units such as 30 and 32 in the desired location with respect to the towing vehicle.

Once the units have been desirably positioned and attached to the structure of the towing vehicle in the manner hereinabove described, the take-up means 70 is actuated whereby to draw mechanism 84 taut, such tension serving to cant extension 56 with respect to the slot 42, which it is received within, and thereby effectively lock said extension with respect to the drawbar. Likewise, when the take-up means is actuated, the couplers 112 are each canted at an angle with respect to the drawbar 22, this being permitted by the fact that couplers 112 freely ride within the slot 42 until such time as tension is placed thereon through mechanism 100, said tension serving to angularly dispose the couplers 112 in both a horizontal plane and a vertical plane with respect to the drawbar, thus tightly securing said couplers in position. Thus, it is seen that when the hitch units are each attached as above described, the drawbar 22 is tightly and securely attached to the towing vehicle.

In the embodiment of the invention illustrated in FIGS. 6–10, the hitch unit 150 is identical to that shown in FIGS. 1–5; however, the drawbar 152 is of a different cross-sectional configuration inasmuch as the same is composed of a pair of oppositely disposed angles 154 and 156 which are joined together with their base ends in abutting relationship, all as clearly shown in FIG. 9. When joined together, the angles 154 and 156 are rigidly interconnected as by a bolt 158 which spans the angles, there being a spacer sleeve 160 carried by said bolts whereby to retain the angles in spaced-apart relationship and form a slot 162 therebetween, the slot 162 receiving the extension 164 of mount 166 and also receiving the flanges 168 of couplers 170.

The hitch unit 150 as illustrated in FIGS. 6–10 is operable in the same manner as that hereinabove previously described, attention being particularly directed to FIG. 8 which shows the manner in which the couplers 170 are inclined in a horizontal plane when tension is placed on the releasable mechanism 172 which serves to couple the bumper 174 with the drawbar 152 as through the actuation of take-up means 176, which take-up means 176 is carried by sleeve 178 of mount 166, said mount 166 being attached to the frame bracket 180 of the towing vehicle by releasable mechanism 182, all in the manner hereinabove described with respect to the embodiment of the invention illustrated in FIGS. 1–6. Hitch unit 150 also carries suitable structure 184 for engaging the rear face of the bumper of the towed vehicle, said structure 184 being shiftably carried by apparatus 186 in order that said structure 184 may be rotated through 180° to thereby permit the face thereof, which is in engagement with the bumper, to present a different angle of inclination and thus accommodate the hitch unit 150 to the bumper of virtually any known vehicle.

Hitch assemblies such as hereinabove described are particularly valuable to the trailer rental industry since the hitch provided by such companies should be universally adaptable to various styles of bumpers so that each trailer distributing outlet will not have to stock a large variety of hitches to accommodate the various types of towing vehicles which the distributor's customers may use. The universal adaptability of hitches such as described herein is enhanced by the fact that the hitch units, and the components which constitute the same, may be shifted longitudinally of the drawbars by which they are carried, all in the manner hereinabove described, to thereby position such hitch units on the drawbar in such a location as to readily and easily accommodate the drawbar to the particular vehicle which is to serve as the towing vehicle, such adjustability and adaptability being necessary in order to permit universal application of the hitch assembly, particularly in view of the many different and various configurations which known bumpers assume.

Having thus described the invention, what is claimed as new and desired to be secured by Letters Patent is:

1. In a hitch for coupling a towed vehicle to attachable structure on a towing vehicle:
 a drawbar, said drawbar having a centrally disposed, longitudinally extending slot formed therein;
 a mount carried by said drawbar and adapted to engage said structure, said mount having an extension thereon passing through said slot and retained therein for movement longitudinally of said slot;
 a first releasable mechanism for attaching said drawbar to said structure, said mechanism including a coupler having a portion extending through said slot for movement longitudinally thereof;
 a second releasable mechanism for attaching said mount to said structure; and
 take-up means on the mount, actuation of said take-up means causing said first and second releasable mechanism to cooperate to tightly retain said drawbar with respect to said structure.

2. The invention of claim 1, said mount including a sleeve formed as an integral part thereof, said take-up means being carried by said sleeve.

3. The invention of claim 2, said take-up means including a screw extending into said sleeve, there being a key plate at one end of the screw adapted for coupling with said second releasable mechanism.

4. The invention of claim 3, said second releasable mechanism being in the form of a chain, one end thereof being coupled with said key plate, the other end having a hook thereon and being attached to said structure.

5. The invention of claim 4, said extension of the mount being U-shaped whereby to present a bight and a paid of legs, one of said legs being connected to said sleeve, the bight being within said slot and the other leg extending laterally from the bight whereby to retain said extension within said slot.

6. The invention as set forth in claim 1, said first releasable mechanism being in the form of a chain, the free ends thereof each being received by a corresponding coupler, the couplers being positioned on opposed sides of said mount.

7. The invention of claim 6, said couplers each having a head, a flange extending normally rearwardly from the head and being within said slot and a lip extending laterally from said flange whereby to retain said flange within said slot.

8. The invention of claim 7, said heads each having a keyhole slot therein for receiving a corresponding free end of said chain.

9. The invention of claim 1, said mount including a member for engaging said structure, there being apparatus shiftably securing said member to said mount for varying the vertical inclination of the latter with respect to the structure when the member is shifted.

References Cited

UNITED STATES PATENTS

| | | | |
|---|---|---|---|
| 3,113,789 | 12/1963 | Safford | 280—502 |
| 3,233,917 | 2/1966 | Lindsey | 280—502 |

LEON FRIAGLIA, Primary Examiner

ROBERT R. SONG, Assistant Examiner